(12) United States Patent
Boday et al.

(10) Patent No.: US 10,113,108 B1
(45) Date of Patent: Oct. 30, 2018

(54) FORMATION OF PHOTOCHROMIC POLYHEXAHYDROTRIAZINES (PHTS)

(71) Applicant: INTERNATIONAL BUSINESS MACHINES CORPORATION, Armonk, NY (US)

(72) Inventors: Dylan J. Boday, Tucson, AZ (US); Jeannette M. Garcia, San Leandro, CA (US); James L. Hedrick, Pleasanton, CA (US); Brandon M. Kobilka, Tucson, AZ (US); Jason T. Wertz, Pleasant Valley, NY (US); Rudy J. Wojtecki, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/479,387

(22) Filed: Apr. 5, 2017

(51) Int. Cl.
  *C09K 9/02* (2006.01)
  *C08G 12/34* (2006.01)

(52) U.S. Cl.
  CPC ............... *C09K 9/02* (2013.01); *C08G 12/34* (2013.01); *C09K 2211/1458* (2013.01); *C09K 2211/1466* (2013.01)

(58) Field of Classification Search
  CPC ..................................................... C09K 9/02
  See application file for complete search history.

(56) References Cited

U.S. PATENT DOCUMENTS

| | | | |
|---|---|---|---|
| 6,787,621 B2 | 9/2004 | Kim et al. | |
| 7,261,843 B2 | 8/2007 | Knox et al. | |
| 7,578,515 B2 | 8/2009 | Appleman | |
| 7,678,515 B2 | 3/2010 | Morimutsu et al. | |
| 7,964,333 B1 | 6/2011 | Belfield | |
| 9,244,410 B1 | 1/2016 | Wu et al. | |
| 9,303,186 B1* | 4/2016 | Boday | C09D 179/04 |
| 9,505,885 B2 | 11/2016 | Wang et al. | |
| 9,617,385 B2* | 4/2017 | Boday | H01L 313/0026 |
| 9,637,596 B2* | 5/2017 | Boday | C08G 73/0644 |
| 9,644,065 B2* | 5/2017 | Boday | C08G 12/08 |
| 9,650,471 B2* | 5/2017 | Boday | H01L 313/0026 |
| 9,701,817 B2* | 7/2017 | Wertz | C08K 5/5415 |
| 9,828,467 B2* | 11/2017 | Boday | C08G 73/065 |
| 2003/0141490 A1* | 7/2003 | Walters | C09K 9/02 |
| | | | 252/585 |
| 2006/0093844 A1 | 5/2006 | Conklin et al. | |
| 2008/0067701 A1* | 3/2008 | Ford | B29D 11/00865 |
| | | | 264/1.1 |
| 2009/0093601 A1 | 4/2009 | Evans et al. | |
| 2011/0215283 A1* | 9/2011 | Morimitsu | C08G 63/685 |
| | | | 252/586 |
| 2014/0027684 A1* | 1/2014 | Evans | C08G 63/08 |
| | | | 252/586 |
| 2015/0104579 A1* | 4/2015 | Hedrick | C08G 65/00 |
| | | | 427/385.5 |
| 2015/0366202 A1* | 12/2015 | Boday | B05D 3/104 |
| | | | 427/302 |
| 2016/0024254 A1 | 1/2016 | Boday et al. | |
| 2016/0046831 A1* | 2/2016 | Boday | B33Y 70/00 |
| | | | 264/401 |
| 2016/0053053 A1* | 2/2016 | Boday | C08G 73/0683 |
| | | | 528/249 |
| 2016/0264734 A1* | 9/2016 | Boday | C08G 73/0644 |
| 2016/0297931 A1* | 10/2016 | Boday | H01L 313/0026 |
| 2016/0300644 A1* | 10/2016 | Boday | H01L 313/0026 |
| 2016/0355639 A1* | 12/2016 | Wertz | C08K 5/5415 |
| 2016/0355669 A1* | 12/2016 | Wertz | C08K 5/5415 |
| 2017/0096528 A1* | 4/2017 | Kee | C08G 65/2639 |
| 2017/0130024 A1* | 5/2017 | Boday | C08L 61/22 |
| 2017/0145161 A1* | 5/2017 | Boday | C08G 73/0644 |
| 2017/0183451 A1* | 6/2017 | Boday | C08G 73/0644 |
| 2017/0226262 A1* | 8/2017 | Boday | C08G 73/0644 |
| 2017/0226290 A1* | 8/2017 | Boday | C08G 73/0644 |

OTHER PUBLICATIONS

Luo et al. (Polym. Chem., 2011, 2, 2435-2443) (Year: 2011).*
A. Whalley et al., Reversible Switching in Molecular Electronic Devices, J. Am. Chem. Soc., 2007, vol. 129, No. 42, pp. 12590-12591.
M. Irie et al., Photochromism of Diarylethene Molecules and Crystals: Memories, Switches, and Actuators, Chemical Reviews, 2014, 114, 12174-12277.
N. Bell et al., Photo-Control of Nanointeractions, Sandia Report, SAND No. 2005-0182, Feb. 2005.
G. Pariani et al., Diarylethene-based photochromic polyurethanes for multistate optical memories, Journal of Materials Chemistry, 2011, 21, 13223-13231.
R. Petroski et al., Improved Horner-Wadsworth-Emmons Preparation of α-Methyl or a-Ethyl-α,β-Unsaturated Esters from Aldehydes, Synthetic Communications, 2001, 31, 89-95.
A. Majumder et al., Reverse-Absorbance-Modulation-Optical Lithography for Optical Nanopatterning at Low Light Levels, AIP Advances, 2016, 6, 065312-1-065312-6.
G. Tsivgoulis et al., New Photochromic Materials, http://www.mariecurie.org/annals/volume1/tsivgoulis.pdf.

* cited by examiner

*Primary Examiner* — Liam J Heincer
(74) *Attorney, Agent, or Firm* — Patterson + Sheridan, LLP

(57) ABSTRACT

Materials and methods for preparing a modified poly(hexahydrotriazines) (PHTs) polymers and modified polyhemiaminals (PHAs) are provided. A monomer precursor, a photochromic precursor, and a formaldehyde material may be combined to form a photochromic polymer. The photochromic polymer may comprise hexahydrotriazine, hemiaminal, polyhexahydrotriazine, polyhemiaminal, or a combination thereof.

20 Claims, No Drawings

FORMATION OF PHOTOCHROMIC POLYHEXAHYDROTRIAZINES (PHTS)

FIELD OF THE DISCLOSURE

Materials and methods described herein relate to modified poly(hexahydrotriazine) (PHT) polymers.

BACKGROUND

Photochromic polymers are receiving attention in various applications including electronic devices, molecular switches, color changing lenses, optical data storage, and selective masking of materials for nanolithography. However, currently utilized polymers often lack characteristics which allow for durability and recyclability. Consequently, a need exists for photochromic polymers that can be recycled and have improved mechanical properties.

SUMMARY

Embodiments described herein relate to methods of making PHTs with photochromic properties.

According to one embodiment, a polymer is provided. The polymer comprises a plurality of hexahydrotriazine units, a plurality of hemiaminal units, or a combination thereof; and a photochromic component covalently bonded to at least one hexahydrotriazine unit or hemiaminal unit.

In another embodiment, a method of forming a photochromic polymer is provided. The method includes providing at least a formaldehyde material and a photochrome amine to form a mixture; and performing a polymerization process on the mixture to form a polymer.

In another embodiment, a method of forming a photochromic polymer is provided. The method includes providing an amine monomer, a diamine monomer, a triamine monomer, or a combination thereof; providing a photochromic monomer; exposing the amine monomer, the diamine monomer, the triamine monomer, or a combination thereof, and the photochromic monomer to a formaldehyde material; and forming a polymer material comprising a polyhemiaminal, a polyhexahydrotriazine, or a combination thereof.

In another embodiment, the photochromic PHT polymers may undergo reversible transformation upon photoirradiation.

DETAILED DESCRIPTION

New kinds of photochromic polymers and materials, and methods of forming them are described herein. The methods include forming a polymer network comprising poly(hexahydrotriazines) (PHTs), poly(hemiaminals) (PHAs), or combinations thereof, and integrating photochromic moieties into the polymer network.

These polymer networks of PHTs, PHAs, or combinations thereof, with photochromic moieties, utilize the property of photochromism which can be defined as the reversible change in molecular properties induced by specific wavelength(s) of light. These properties can be thermally reversible or irreversible dependent on the pendant groups around the photochromic centers, and there can be more than two potential photochromic states.

Diarylethenes (DAEs), such as the functionalized bisthienyl perfluorocyclopentenes, are an exemplary class of photochromic compounds that can be used for the photochromic polymers. DAEs are chemically and thermally stable, afford the ability to tune physical and optical properties of a material through chemical synthesis, and can be used in processes such as reverse absorbance-modulation-optical lithography among others. Other compounds suitable for incorporation into PHAs, PHTs, and combinations thereof, include the variations of azobenzene, fulgides, sterically overcrowded stilbenes, spiropyrans, diarylethenes, salicylideneimines, viologens, and azulenes.

The method generally includes forming a polymer, such as PHA or PHT, or a combination thereof, by reaction of an amine, a bridging group, and a formaldehyde (i.e., formaldehyde or paraformaldehyde), optionally in the presence of a solvent, at an elevated temperature.

The materials described herein offer several advantages over conventional thermosets due to their ability to be recycled and their improved mechanical properties. Also, by tailoring the amount of photochromic moieties within the polymer, the responsiveness and the materials' properties may be altered depending on the application.

It should be understood that any photochromic compound capable of being incorporated into a PHA and/or PHT polymer can be used. To incorporate the photochromic compound into the PHA and/or PHT polymer, for example, the photochromic compound should be able to undergo transformation to a compound that has one or more primary amines. As an illustration, typical non-limiting examples of photochromic moieties are given below (1A, 1B, and 1C).

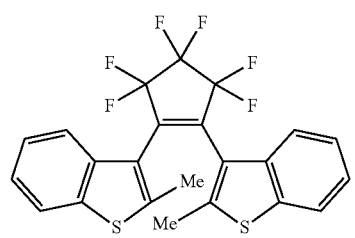

1A

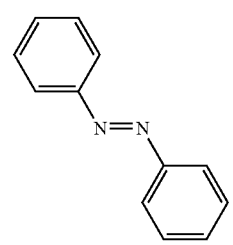

1B

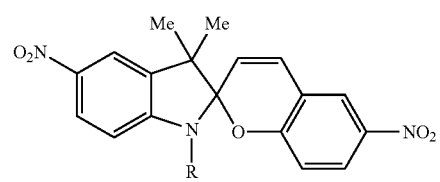

1C 1A is a diarylethene, 1B is an azobenzene, and 1C is a furylfulgide. These examples undergo isomerization upon irradiation with ultraviolet (UV) light, with a concomitant change in color. To incorporate such molecules into PHA and PHT, the molecules should have amine functionality, such as diamino-diarylethene (amino-1A), 4,4'-diamino-azobenzene (amino-1B), and diamino-furylfulgide (amino-1C).

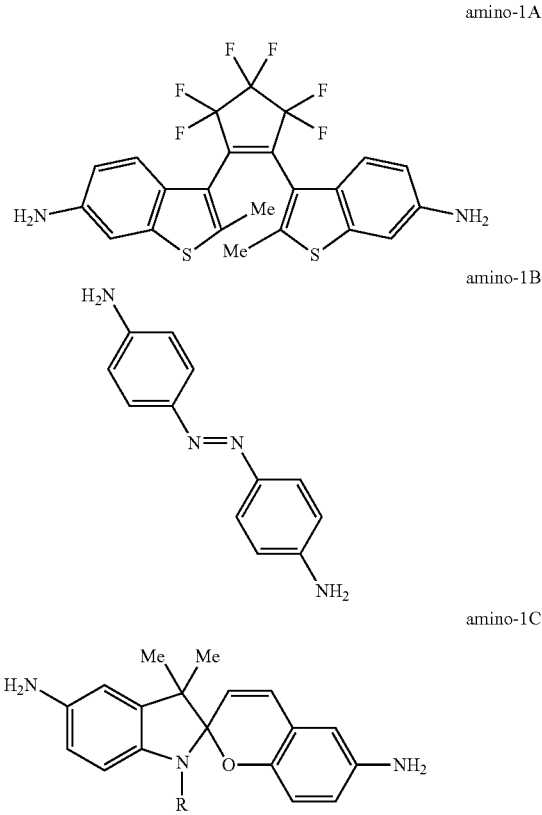

As described below, 1A can be transformed to amino-1A (3,3'-(perfluorocyclopent-1-ene-1,2-diyl)bis(2-methylbenzo[b]thiophene)) by a few synthetic manipulations. 4,4'-Di aminoazobenzene (Amino-1B) is commercially available from Alfa Aesar. The furylfulgide (Spiro[2H-1-benzopyran-2,2'-[2H]indole], 1',3'-dihydro-1',3',3'-trimethyl-5',6-dinitro-) 1C can be reduced to the corresponding aniline as amino-1C. Those molecules described above as well as other examples of photochromic molecules are described in M. Irie et al., Chemical Reviews, 2014, 114, 12174-12277, and N. Bell et al., Sandia Report, SAND No. 2005-0182, February 2005.

This disclosure includes chemical structures that show atomic compositions of compounds and relative bonding arrangements of atoms in a chemical compound. Unless specifically stated, the geometric arrangement of atoms shown in the chemical structures is not intended to be an exact depiction of the geometric arrangement of every embodiment, and those skilled in the chemical arts will recognize that compounds may be similar to, or the same as, the illustrated compounds while having different molecular shapes or conformations. For example, the structures denoted herein may show bonds extending in one direction, while embodiments of the same compound may have the same bond extending in a different direction. Additionally, bond lengths and angles, Van der Waals interactions, isoelectronic structures, and the like may vary among instances of the same chemical compound. Additionally, unless otherwise noted, the disclosed structures cover all stereoisomers, conformers, rotamers, isomers, enantiomers, of the represented compounds.

Numbered chemical structures are numbered using numbers, or numbers and letters, in parentheses. Numbered chemical reaction schemes are numbered using numbers, or numbers and letters, in square brackets. Unless otherwise noted, chemical reactions are performed at ambient conditions or under slight heating with no special atmosphere or head space, and may be performed using standard organic solvents to manage mixing properties such as viscosity and flow index.

The polymer may be made from precursor monomers functionalized with photochromic moieties. These precursors can react with bridging group monomers and a formaldehyde material (i.e., formaldehyde or paraformaldehyde), optionally in the presence of a solvent, at an elevated temperature to form a polymer material comprising a polyhemiaminal, a polyhexahydrotriazine, or a combination thereof.

The photochromic polymers may incorporate polymer or oligomer groups as monovalent species, divalent bridging groups, or trivalent bridging groups. By attaching polymer or oligomer groups with varied glass transition temperatures to the photochromic polymer, the switching speed of the photochromes can be varied. For example, the switching speed of photochromes can be enhanced by reducing the glass transition temperature ($T_g$) of the polymer. As an illustration, amino-functionalized polymers can be incorporated into the PHT and/or PHA polymer. The $T_g$ of the material can be reduced by adding an amino fluoropolymer such as amino-polyvinyl fluoride.

The photochromic polymers may include single molecule species and/or oligomers, which may include PHT and/or PHA species. The photochromic polymers may be made using a diamino-DAE, and optionally a monomer comprising a bridging group or a monovalent species, and reacting the diamine-DAE and the optional monomer with a formaldehyde material (i.e., formaldehyde or paraformaldehyde) to facilitate polymeric crosslinking. While the photochromic polymers may be composed entirely of photochromic moieties (i.e., diamino-DAEs) and a formaldehyde material, only a relatively small amount of photochromic moieties are needed for photochromism due to the large extinction coefficient of the moieties. Accordingly, depending on the application, bridging groups and/or monovalent species may be added to the mixture.

Generally, the polymers referred to herein can have the structure:

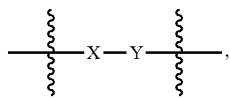

where X has the structure

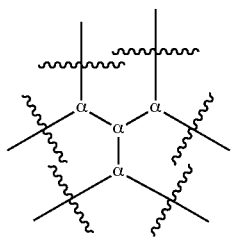

and Y may have the structure

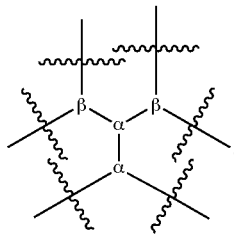

Each α and β may be further linked to another α and/or β. The symbols α and β represent polymer portions, a first portion α and a second portion β, with different functionalities. In addition, the polymers referred to herein can be made entirely of X or entirely of Y.

Such polymers may be used to form a polymer network of the first and second portions in any desired amounts. Here, the first portion α is shown as a trivalent group, but a may have any effective valence from 3 to 6, as further described below.

The first portion α may be a PHA or PHT polymer group. A PHT is a polymer that includes a plurality of trivalent hexahydrotriazine (HT) groups having the structure

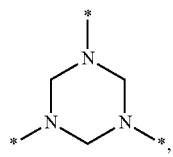

(11)

covalently linked to a plurality of bridging groups $$K'\!-\!\!(\!*)_{y'},$$ (12)

wherein y' is 2 or 3, and K' is a divalent or trivalent radical. In this disclosure, starred bonds represent attachment points to other portions of the chemical structure. Each starred bond of a given HT group is covalently linked to a respective one of the bridging groups. Additionally, each starred bond of a given bridging group is covalently linked to a respective one of the HT groups. Thus, in some cases, α is an HT group as in structure (11).

A PHA is a polymer that includes a plurality of trivalent hemiaminal (HA) groups having the structure

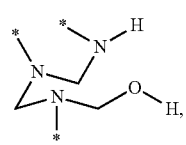

(13)

covalently linked to a plurality of the bridging groups of formula (12).

In one example, a PHA can be represented by the structure

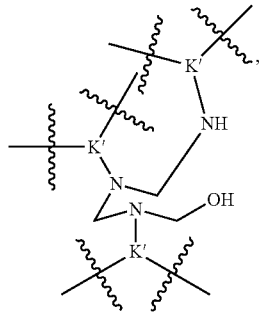

(14)

wherein the bridging groups K' are trivalent (y'=3 in formula 2). In this example, the first portion α is a hexavalent PHA. Similarly, a PHT can be represented by the structure

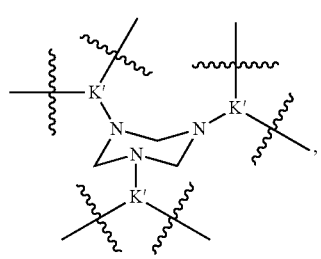

(15)

and in such an example the first portion α is a hexavalent PHT. In the case of divalent bridging groups K' (y'=2 in formula 2), the first portion α may have either, or both, of the following structures

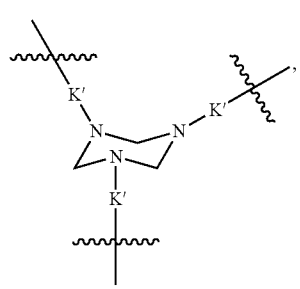

(16)

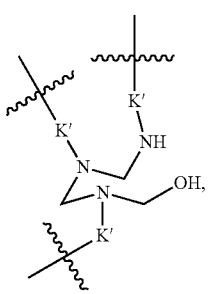

(17)

wherein the structure of formula (16) is a PHT structure and the structure of formula (17) is a PHA structure. The first portions a of formulas (16) and (17) are trivalent. Using a mixture of divalent and trivalent bridging groups K', which may be a PHT or PHA structure, the first portion α may have valence from 3 to 6.

Trivalent bridging groups K' that may be part of a polymer network include the following structures:

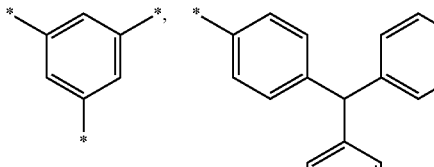

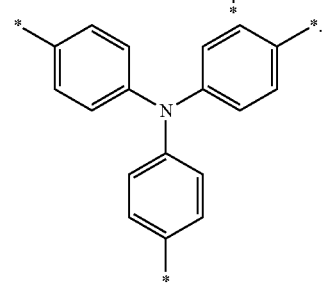

Alternately, the trivalent bridging groups can be photochromes, for example, photochrome amines. These trivalent bridging structures may be included in the network by adding primary amine-terminated molecules containing these bridging structures to the reaction mixture with other primary amines, diamines, triamines, and a formaldehyde material. Such structures may also be included to increase network bonding and density.

The second portion β may have valence from 1 to 3, and may be a polymer that is partially or fully degradable at elevated temperatures or under basic conditions. The second portion β may be a linear or quasi-linear polymer group, or the second portion β may have a cyclic center such as an HA or HT center. The second portion β may be a monovalent substituent group, a divalent bridging group, or a trivalent bridging group.

Examples of substituent groups that may be covalently linked to the second portion β may be a photochromic species, an amino-functionalized polymer such as polyethers (i.e., PEG), polyacrylates, polyepoxides, fluoropolymers, or combinations thereof, or other species described herein.

The second portion β may be a divalent linkage with a PHT or PHA core and a monovalent substituent. The second portion β may also be a divalent linkage with a PHT or PHA core, a divalent substituent, and a monovalent diluent group. A divalent linkage with PHT and PHA cores, respectively, and monovalent substituents have the general structures

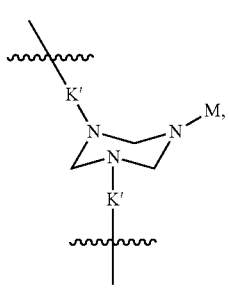

(18)

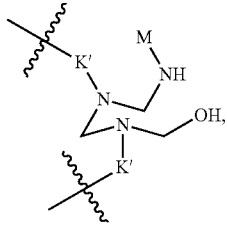

(19)

wherein M is a monovalent substituent, which may be any convenient small molecule or polymer that may be functionalized with a primary amine group including, for example, amino PEG (i.e., monofunctional amino PEG), amino polyacrylates, and amino fluoropolymers. The monovalent substituent may also be a photochromic species, for example, photochrome amines. A divalent linkage with PHT and PHA cores, respectively, and divalent substituents have the general structures

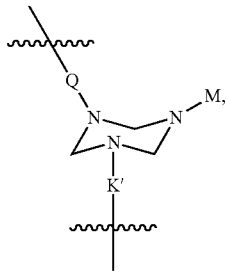

(20)

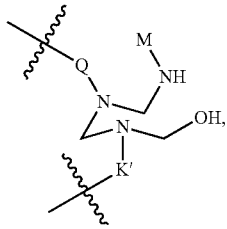

(21)

wherein M is a monovalent substituent that may be unreactive, acid degradable, base degradable, and/or thermally degradable, Q is a divalent bridging group, and K' is a divalent or trivalent bridging group.

Other monovalent substituents that may be used as the monovalent substituent M include groups having the structures of the following formula:

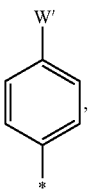

(22)

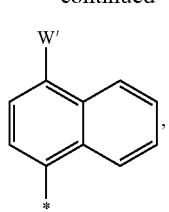

(23)

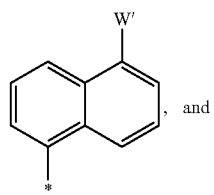

(24)

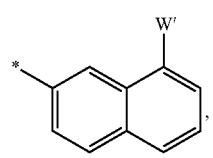

(25)

wherein W' is a monovalent radical selected from the group consisting of —N(R$^1$)(R$^2$), —OR$^3$, —SR$^4$, wherein R$^1$, R$^2$, R$^3$, and R$^4$ are independent monovalent radicals comprising at least one carbon. The starred bond is linked to a nitrogen of a hemiaminal group or a hexahydrotriazine group. Non-limiting exemplary monovalent groups having the structures of formulae 22-25 include:

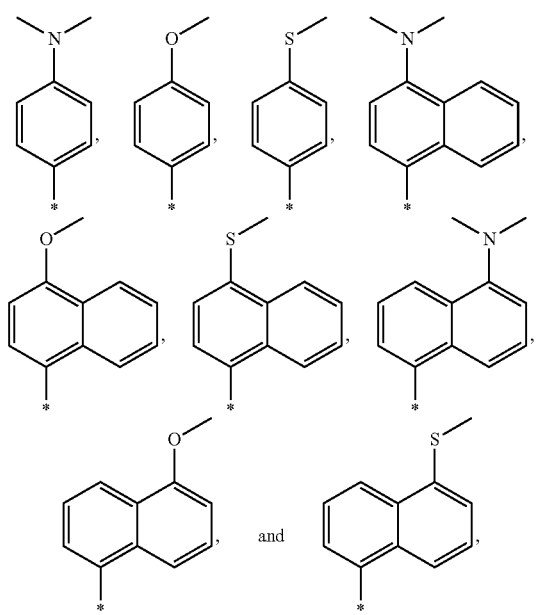

wherein the starred bond is linked to a nitrogen of a hemiaminal group or a hexahydrotriazine group. Monovalent groups can be used singularly or in combination. Alternately, the monovalent groups can be photochromes, for example, photochrome amines. These monovalent structures may be included in the network by adding primary amine-terminated molecules containing these structures to the reaction mixture with other primary amines, diamines, triamines, and a formaldehyde material.

Non-limiting exemplary monomers that give rise to monovalent groups in a polymeric network include N,N-dimethyl-p-phenylenediamine (DPD), p-methoxyaniline (MOA), p-(methylthio)aniline (MTA), N,N-dimethyl-1,5-diaminonaphthalene (15DMN), N,N-dimethyl-1,4-diaminonaphthalene (14DMN), and N,N-dimethylbenzidene (DMB), which have the following structures:

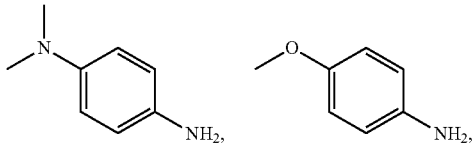

(DPD)  (MOA)

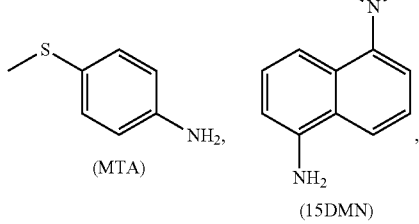

(MTA)  (15DMN)

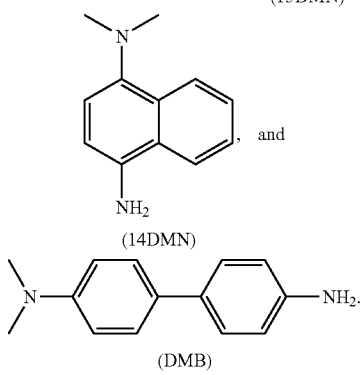

(14DMN)

(DMB)

Some embodiments described herein are polymer networks having a PHA or PHT core, or a mixture thereof. Polymers having a PHA or PHT core are generally made by reacting a primary amine, or mixture thereof, with a formaldehyde or oligomers thereof. The amino group of the primary amine reacts with the aldehyde to form a cyclic trimer that is a hydrogenated triazine. If a primary diamine is included, the diamine may cyclotrimerize at both ends to form the PHA or PHT network. In one example, 4,4'-oxydianiline is mixed with paraformaldehyde and heated to about 50° C. to form a PHA network. Further heating up to 200° C. forms a PHT network. The PHA network may be non-covalently bonded with water through hydrogen bonding, or with another solvent. A PHA complex with water has the general structure of formula (26)

(26)

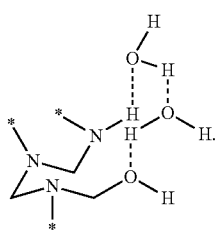

Divalent bridging groups Q usable for the networks described herein may have at least one 6-carbon aromatic ring. A category of such divalent bridging groups may be represented by the structure of formula (27)

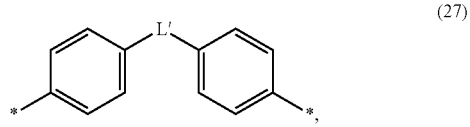

(27)

wherein L' is a divalent bridging group selected from the group consisting of —O—, —S—, —N(R')—, —N(H)—, —R"—, and combinations thereof, wherein R' and R" independently comprise at least 1 carbon. In an embodiment, R' and R" are independently selected from the group consisting of methyl, ethyl, propyl, isopropyl, phenyl, and combinations thereof. Other L' groups include methylene (—CH$_2$—), isopropylidenyl (—C(Me)$_2$-), and fluorenylidenyl:

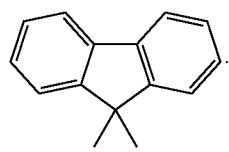

Other divalent bridging groups Q that may be used include:

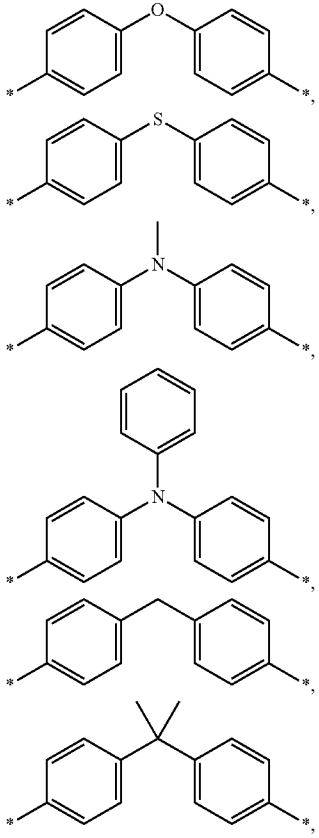

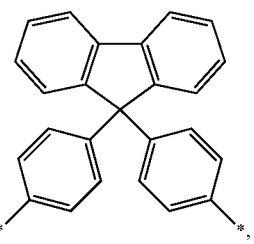

-continued and combinations thereof.

Alternately, the divalent bridging groups can be photochromes, for example, photochrome amines. These divalent bridging structures may be included in the network by adding primary amine-terminated molecules containing these bridging structures to the reaction mixture with other primary amines, diamines, triamines, and a formaldehyde material.

Non-limiting examples of monomers comprising two primary aromatic amine groups that may be used to include the divalent groups described above include 4,4'-oxydianiline (ODA), 4,4'-methylenedianiline (MDA), 4,4'-(9-fluorenylidene)dianiline (FDA), p-phenylenediamine (PD), 1,5-diaminonaphthalene (15DAN), 1,4-diaminonaphthalene (14DAN), and benzidene, which have the following structures:

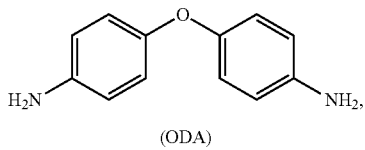

(ODA)

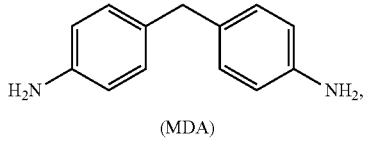

(MDA)

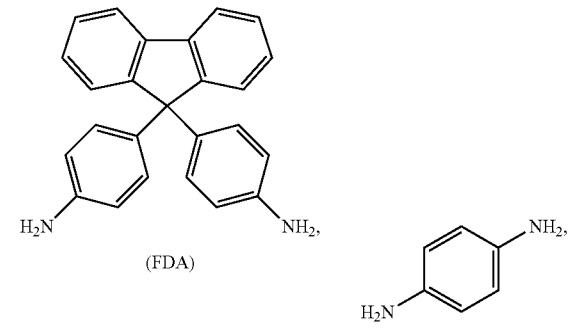

(FDA)

(PD)

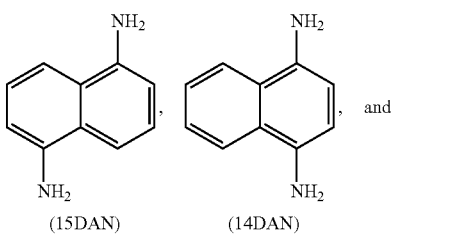

(15DAN)   (14DAN)

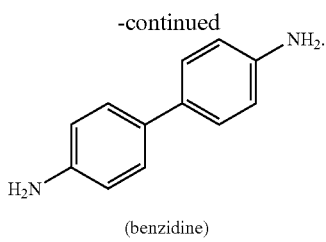

(benzidine)

The divalent bridging groups Q may include polymer or oligomer groups. The corresponding precursor may be a diamine-terminated polymer or oligomer, such as a diamine-terminated vinyl polymer, a diamine-terminated polyether, a diamine-terminated polyester, a diamine-terminated star polymer, a diamine-terminated polyaryl ether sulfone, a diamine-terminated polybenzoxazole polymer, a diamine-terminated polybenzimidazole polymer, a diamine-terminated epoxy resin, a diamine-terminated polysiloxane polymer, a diamine-terminated polybutadiene polymer, and a diamine-terminated butadiene copolymer. Diamine-terminated polyethers are commercially available from suppliers such as Huntsman Corp. Diamine-terminated vinyl polymers include long-chain alkyl diamines which may be referred to as polyalkylene diamines, for example polyethylene diamine, polypropylene diamine, and other such polymer diamines. Diamine-terminated vinyl polymers also include long-chain polymer diamines with cyclic and/or aromatic components, such as diamine-terminated polystyrene. The diamine-terminated polymers and oligomers referred to above are commercially available, or may be readily synthesized through well-known reaction pathways.

Usable solvents for the polymerization reaction can be any suitable solvent. Exemplary solvents include dipolar aprotic solvents such as, for example, N-methyl-2-pyrrolidone (NMP), dimethylsulfoxide (DMSO), N,N-dimethylformamide (DMF), N,N-dimethylacetamide (DMA), propylene carbonate (PC), N-cyclohexyl-2-pyrrolidone (CHP), N,N'-dimethylpropyleneurea (DMPU), and propylene glycol methyl ether acetate (PGMEA). Additionally, the solvent may be an excess precursor.

In one example, a PHT network containing ODA bridging groups may have the structure where K' may be any of the aforementioned monomers or bridging groups, including photochromic moieties. In general, photochromic species K' useful for the reaction are thermally stable.

A precursor mixture for forming the polymers described herein may include more than one precursor $K'$—$(NH_2)_x$ and all precursors in the mixture may be divalent or trivalent, or the precursors may be a mixture of monovalent (x=1), divalent (x=2), and trivalent (x=3) species, so long as some divalent or trivalent species are included in the mixture to promote formation of a polymer network.

In general, polymer species K' useful for the reactions described herein may be thermoplastic, thermoset, quasi-thermoplastic, or any combination thereof. Quasi-thermoplastic polymers are those polymers that have a low degree of thermoplasticity derived by partially curing or crosslinking an initially thermoplastic polymer. Including thermoplastic components in the polymer adds toughness and resiliency to the eventual polymeric material.

The remainder of the description focuses on diarylethenes as the photochromic moieties that are incorporated into a PHT, PHA, or a polymer made of combinations thereof. However, it should be understood that any photochromic moiety compound capable of being incorporated into a PHT, PHA, or combinations thereof, can be used. To incorporate the photochromic compound, for example, the photochromic compound should be able to undergo transformation to a compound that has one or more primary amines.

In one embodiment, the photochromic moieties may be diamino diarylethenes (diamino-DAEs) which may include thiophenes (29, 30, 31, 32). Exemplary diamino-DAEs are shown below, including bithiophene 29, thienothiophene 30, phenylthiophene 31, and benzothiophene 32. 29-32 are non-limiting examples of diamino-DAEs that can be incorporated into PHT and/or PHA polymers.

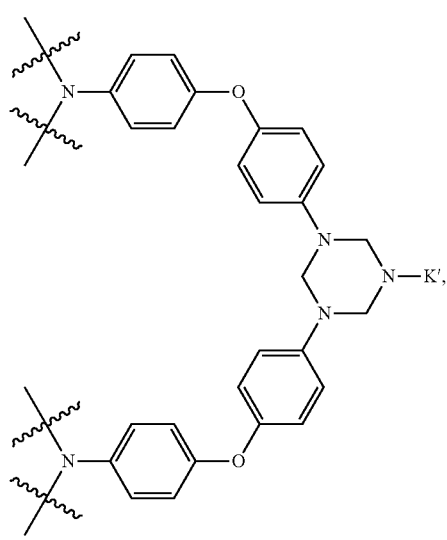

(28)

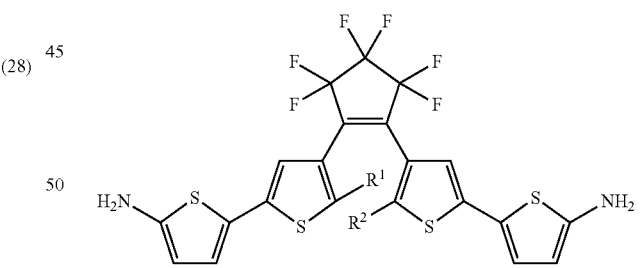

29

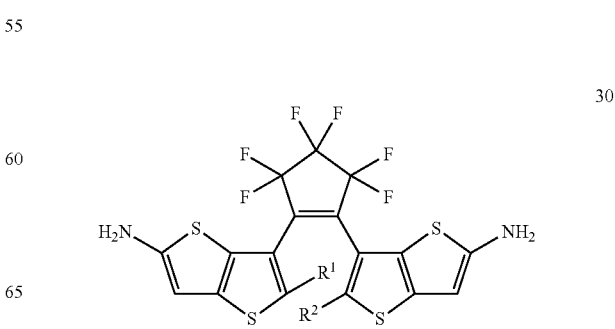

30

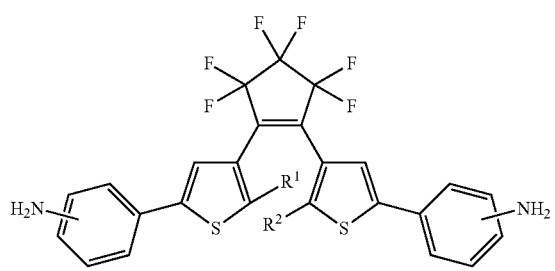

31

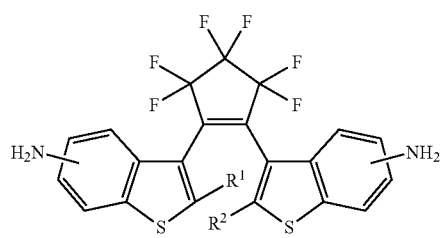

32

Diamino-DAEs are shown above and represented as 29-32. The R groups ($R^1$ and $R^2$) can be identical or different and include alkyl substituents, alkoxy substituents, aryl substituents, or a combination thereof. In addition, the DAEs may comprise naphthalene moieties, furan moieties, pyridine moieties, and other heterocyclic moieties, and fused heterocyclic moieties. The diamino-DAEs 31 and 32 may have the amine at various positions on the phenyl moiety. It is contemplated that any suitable diamino-DAE that exhibits thermal stability may be utilized. The diamino-DAE may also act as a bridging group of the polymer network.

Other photochromic diarylethenes include classes of compounds where the bridge is not fluorinated (33), compounds where the bridge is a ring that is larger than a 5-membered ring (34) (i.e., n>1), or compounds without a ring at the bridge (35). The bridge can also include heteroatoms at one or more positions on the bridging structure (36) such as —O—, —N—, —P—, and —S—. Moreover, the diarylethenes do not have to be thiophenes (37), such as X includes —O— and —N—.

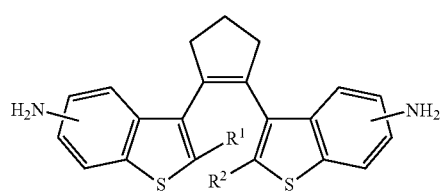

33

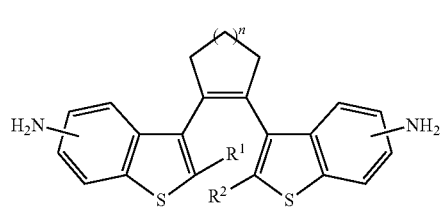

34

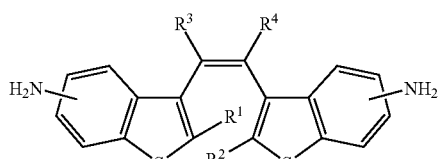

35

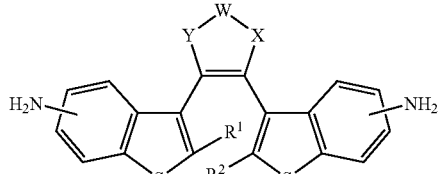

36

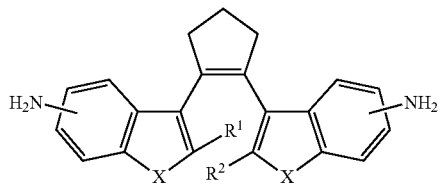

37

Diamino-DAEs can be synthesized by various known methods. Exemplary methods are shown below in Scheme 1.

Scheme 1

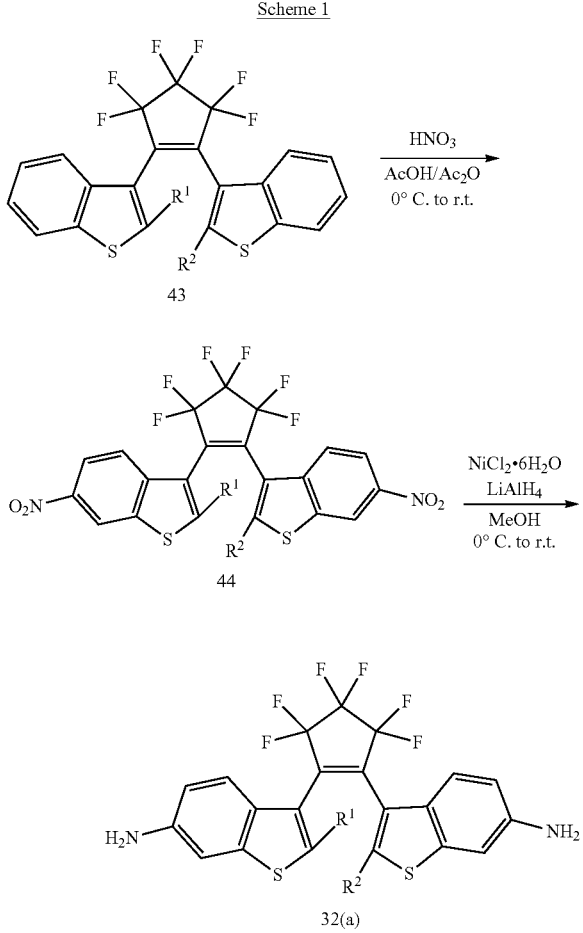

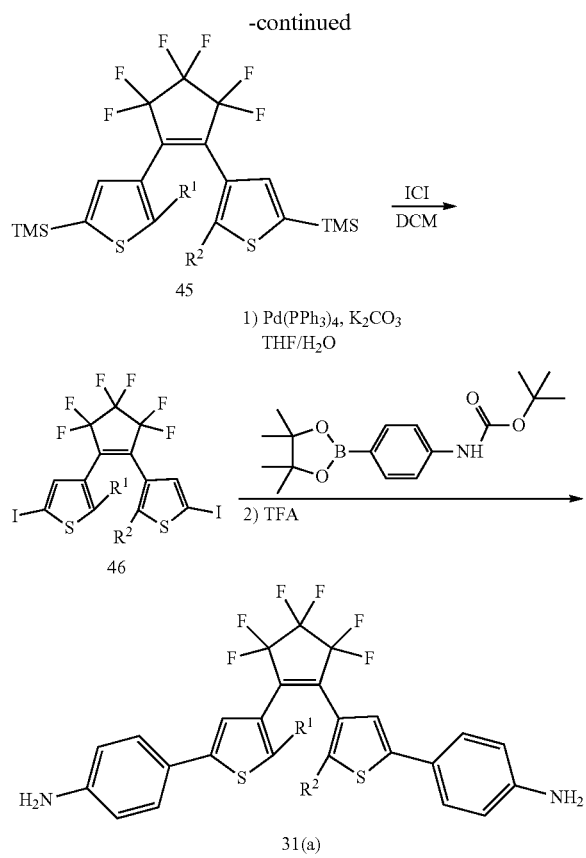

1,2-Bis(2-methylbenzo[b]thiophene-3-yl)-3,3,4,4,5,5-hexafluoro-1-cyclopentene 43 (R'=CH$_3$, R$^2$=CH$_3$) can be prepared according to known procedures or can be purchased from TCI America.

In an embodiment, and as shown in Scheme 1, DAE 43 may be transformed to diamino-DAE 32(a) via nitration and subsequent reduction, in the following exemplary process. To a solution of acetic acid (AcOH) and acetic anhydride (Ac$_2$O) at 10° C. is added DAE 23. Nitric acid (HNO$_3$) is then added while the temperature was kept below 10° C. The reaction may proceed at a temperature of about 0° C. to about 10° C. The reaction mixture is then stirred overnight at about room temperature. Cold water is then added to the mixture. The solution is neutralized and extracted with ethyl acetate. The organic layer is dried over magnesium sulfate (MgSO$_4$), filtrated, and concentrated by standard solvent removal procedures. The residue is then purified by standard purification methods such as column chromatography to give dinitro-DAE 44. Lithium aluminum hydride (LiAlH$_4$) is gradually added to a stirred suspension of dinitro-DAE 44 and nickel(II) chloride hexahydrate (NiCl$_2$.6H$_2$O) in any suitable solvent, for example methanol (MeOH), at a temperature of about 0° C. Sodium borohydride may be used instead of LiAlH$_4$. The mixture is allowed to warm to a temperature of about room temperature and then stirred for about 2 hours. Dichloromethane (DCM) is then added to the reaction mixture. The mixture is washed with brine and then dried with sodium sulfate. Standard procedures for solvent removal and purification are then accomplished to give diamino-DAE 32(a)(R$^1$=CH$_3$, R$^2$=CH$_3$) as 3,3'-(perfluorocyclopent-1-ene-1,2-diyl)bis(2-methylbenzo[b]thiophen-6-amine). This methodology can be applied to many DAEs.

In an embodiment, and as shown in Scheme 1, trimethylsilyl (TMS)-protected bisthienyl DAE 45 (R$^1$=CH$_3$, R$^2$=CH$_3$) ((perfluorocyclopent-1-ene-1,2-diyl)bis(5-methylthiophene-4,2-diyl))bis(trimethylsilane) may be transformed to diamino-DAE 31(a) via electrophilic halogenation, cross-coupling, and deprotection in the following exemplary process. DAE 45 is dissolved in any suitable solvent such as dichloromethane (DCM). Iodine monochloride (ICl) (2.1 equiv.) is then added dropwise at about room temperature. The reaction may proceed at a temperature of about room temperature for about 20 minutes and aqueous sodium thiosulfate (Na$_2$S$_2$O$_3$) is added. The organic phase is removed and dried over MgSO$_4$. Standard procedures for solvent removal and purification are then performed to provide diiodo-bisthienyl DAE 46. In a 2-necked round bottom flask equipped with a reflux condenser and magnetic stir bar, a solution of tetrahydrofuran (THF) (14 mL) and water (7 mL) was degassed by bubbling with argon for 15 minutes. To this solution was added DAE 46 (0.799 mmol), tert-butyl-N-methyl-N-[4-(4,4,5,5-tetramethyl-1,3,2-dioxaborolan-2-yl)phenyl]carbamate (1.76 mmol) (commercially available from Sigma-Aldrich or synthesized from 4-bromoaniline), tetrakis(triphenylphosphine)palladium (Pd(PPh$_3$)$_4$) (0.063 mmol) (commercially available from Sigma-Aldrich), and potassium carbonate (K$_2$CO$_3$) (12.8 mmol). The resultant mixture is heated at reflux for 14 hours, then cooled to room temperature, at which point aqueous saturated ammonium chloride (NH$_4$Cl) is added. The aqueous layer is extracted with DCM three times and dried over MgSO$_4$. Standard procedures for solvent removal and purification are then performed. The product is then dissolved in any suitable solvent, such as DCM, and trifluoroacetic acid (TFA) is added at a temperature of about 0° C. The mixture is allowed to warm to a temperature of about room temperature and stirred for about 10 minutes. Standard procedures for solvent removal and purification are then performed to give diamino-DAE 31(a) (R$^1$=CH$_3$, R$^2$=CH$_3$) as 4,4'-((perfluorocyclopent-1-ene-1,2-diyl)bis(5-methylthiophene-4,2-diyl))dianiline.

In the halogenation step, N-bromosuccinimide (NBS) may be used to provide a dibromo compound similar to compound 46, which may be used for a subsequent cross-coupling and removal of the tert-butyloxycarbonyl protecting group to give diamino-DAE 31(a). This method may also be used to synthesize diamino-DAE 29 by substituting a thiophene version of the phenylcarbamate used in the cross-coupling reaction. One skilled in the art would know the conditions necessary for transformation of the vinylsilane to a bromine compound using NBS, but the conditions should largely remain the same.

It is contemplated that diamino-DAEs 31 and 32 may have the amine at various positions on the phenyl moiety. It is contemplated that any suitable DAE that exhibits thermal stability may be utilized. The synthetic sequence of halogenation, cross-coupling and deprotection can be used to form diamino-DAEs 31 and 32 where the amine is at various positions of the phenyl moiety. For example, the cross-coupling may occur with a boronic acid where the protected amine is meta or ortho to the boronic acid substituent.

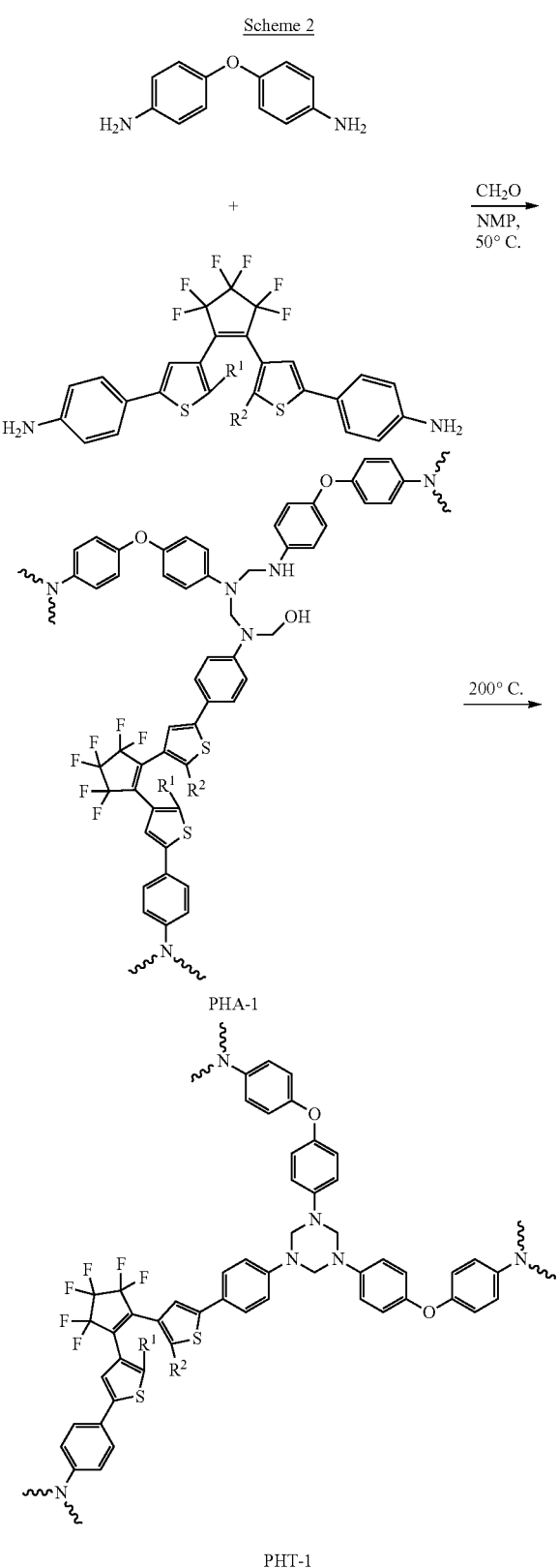

Scheme 2

PHA-1

PHT-1

As an example of an embodiment, Scheme 2 shows formation of a photochromic polymer by reaction of a divalent bridging group (i.e., ODA), a diamino-DAE, and a formaldehyde (i.e., paraformaldehyde or formaldehyde) in the presence of N-methyl-2-pyrrolidinone. The reaction mixture is heated gently while mixing to form a gel. The gel is generally a chemical gel, such as an organogel, that includes a polymer dispersed in a solvent. The solvent may be any of the solvents described herein, or the solvent may be one or more excess precursors described above. The solvent generally maintains separation of polymer chains in the mixture to preserve the gel properties. The reaction may be performed at temperatures of 50° C. to 200° C. As aforementioned, it is contemplated that various R groups can be used. PHA-1 ($R^1$=$CH_3$, $R^2$=$CH_3$) is poly(((((4-(4-aminophenoxy)phenyl)(((4-(4-aminophenoxy)phenyl)amino)methyl)amino)methyl)(4-(4-(2-(5-(4-aminophenyl)-2-methylthiophen-3-yl)-3,3,4,4,5,5-hexafluorocyclopent-1-en-1-yl)-5-methylthiophen-2-yl)phenyl)amino)methanol). PHT-1 ($R^1$=$CH_3$, $R^2$=$CH_3$) is poly(4,4'-(((5-(4-(4-(2-(5-(4-aminophenyl)-2-methylthiophen-3-yl)-3,3,4,4,5,5-hexafluorocyclopent-1-en-1-yl)-5-methylthiophen-2-yl)phenyl)-1,3,5-triazinane-1,3-diyl)bis(4,1-phenylene))bis(oxy))dianiline).

A method of preparing a photochromic polymer, comprising forming a first mixture comprising i) an optional monomer, ii) a photochromic monomer, iii) an optional monovalent monomer, iv) a formaldehyde material (i.e., formaldehyde or paraformaldehyde), and v) optionally, a solvent, and heating the first mixture at a temperature of at least 50° C. thereby forming a second mixture comprising PHA. The second mixture may then be heated to a temperature of about 150° C., preferably about 165° C. to about 280° C., thereby forming a third mixture comprising a PHT. The heating time at any of the above temperatures can be about 1 minute to about 24 hours. The photochromic polymer may include combinations of both PHA and PHT. The optional monomer may include a monovalent group, divalent group, trivalent group, or a combination thereof. The photochromic monomer may be a monoamine, diamine, or a triamine. There should be at least one bridging group to facilitate formation of the polymer, and this bridging group may comprise a divalent bridging group, a trivalent bridging group, or a photochrome species.

Alternatively, a method of preparing a photochromic polymer, comprising forming a first mixture comprising i) an optional monomer comprising either one, two, or three aromatic primary amine groups, ii) a photochromic monomer, iii) an optional monovalent monomer comprising one aromatic primary amine group, iv) a formaldehyde material (i.e., formaldehyde or paraformaldehyde), and v) optionally, a solvent, and heating the first mixture at a temperature of at least 50° C. thereby forming a second mixture comprising PHA. The second mixture may then be heated to a temperature of about 150° C., preferably about 165° C. to about 280° C., thereby forming a third mixture comprising a PHT. The heating time at any of the above temperatures can be about 1 minute to about 24 hours. The PHT polymer may include combinations of both PHA and PHT. The photochromic monomer may be a monoamine, diamine, or a triamine. There should be at least one bridging group to facilitate formation of the polymer, and this bridging group may comprise a divalent bridging group, a trivalent bridging group, or a photochrome species.

Alternatively, the photochromic polymer can be prepared by heating the solution comprising the PHA at a temperature of at least 150° C., preferably about 165° C. to about 280° C., and most preferably at about 200° C. for about 1 minute to about 24 hours.

The bridging groups in Scheme 2 are shown as divalent groups, but as noted above, a mixture of divalent and trivalent groups may be present, optionally with some monovalent groups. Additionally, different photochromic moieties, or combinations of photochromic moieties may be used in the polymer. Moreover, the ratio of photochromic moiety to bridging groups, or other species, may be altered.

Performing the reaction at lower temperatures, for example below about 80° C., forms a polyhemiaminal, such as PHA-1. The wavy bonds link the bridging group with a nitrogen atom of another hemiaminal group.

The polymerization reaction proceeds through the hemiaminal stage at low temperatures, and at higher temperatures water is eliminated as the free amine and hydroxyl groups react to close the ring. The polymer formed at the hemiaminal stage may be referred to as a hemiaminal dynamic covalent network (HDCN). Thus, a single polymer chain, network, or mixture may include a mixture of PHAs and PHTs depending on how the reaction is performed. If the reaction is performed for an extended time at a temperature above about 80° C., the polymer will be a polyhexahydrotriazine. If the reaction temperature never exceeds 80° C., the polymer will be mostly, or entirely, polyhemiaminal. If the reaction is performed for a time at a temperature between 50° C. and 80° C., and then continued at a temperature above 80° C. for a limited time, a mixed polymer including hemiaminal and hexahydrotriazine units may be formed, along with any included spacer units.

The reaction forms a gel, which is a polymer dispersed in a solvent. The properties of the gel formed will depend on the reaction performed, the precursors used, and the solvents used. In general, for subsequent operations of the method, the gel has sufficient structural strength to be removed from a reaction vessel and transferred to another vessel.

The resulting polymer is a product containing hexahydrotriazine, hemiaminal, or combinations of both, linked by the bridging groups described above. The polymer includes repeating units that have N—C—N bonds, and that are linked by bridging groups that may be divalent or trivalent, and that may be photochromic moieties, as described above. The polymers formed by the methods described herein have improved toughness, but also have the ability to be chemically altered and/or recycled. The polymers also have photochromic properties.

In an embodiment, the diamino-DAEs may be incorporated into the monomeric feedstock of a hemiaminal dynamic covalent network (HDCN) and subsequent PHT-forming polymerization with other diamines.

In an embodiment, the amount of diamino-DAE may be relatively low compared to the other diamines used in the monomer feedstock (less than 10%) to achieve the desired color saturation upon the light-induced ring-closing reaction. It should be understood that many types of PHAs and PHTs may be made in the polymerization process. For example, the HT may be bonded to one or more of a photochromic moiety, and/or one or more of the bridging groups described herein, and or one or more of a monomer. Additionally, the polymeric network may contain both PHA and PHT.

By tailoring the amount of photochromic moieties within the polymer, the responsiveness and the materials' properties may be altered depending on the application of use. In addition to its application for photochromic materials, PHT polymers offer several advantages over conventional thermosets due to their ability to be recycled and the ability to have improved mechanical properties.

In an embodiment, the bridging group has an A-B-A structure, where B is a photochromic moiety and A has a primary diamine. This A-B-A moiety, having primary amines, can then participate in PHT/PHA polymerization with a formaldehyde material. The photochromic moiety has groups such as aldehydes, ketones, alkenes, alkynes, and the like, where it can be functionalized. For example, an A-B-A group may be a photochromic polyurethane. Di-aldehyde (50) ($R^1$=$CH_3$, $R^2$=$CH_3$) (4,4'-((perfluorocyclopent-1-ene-1,2-diyl)bis(5-methylthiophene-4,2-diyl))dibenzaldehyde) can be formed by a Suzuki coupling of commercially available 4-formylphenylboronic acid (52) with di-iodide 51 ($R^1$=$CH_3$, $R^2$=$CH_3$) (3,3'-(perfluorocyclopent-1-ene-1,2-diyl)bis(5-iodo-2-methylthiophene)), as shown in Scheme 3. In Scheme 3, as for other diarylethenes, the R groups ($R^1$ and $R^2$) can be identical or different and include alkyl substituents, alkoxy substituents, aryl substituents, or a combination thereof. One skilled in the art will appreciate that various boronic acids may be used in the Suzuki coupling such that a variety of compounds can be formed. The procedure for such a coupling would be similar to the coupling described above. The aldehydes of 50 can be reduced to the corresponding alcohols (not shown) and then polymerized with an isocyanate to a polyurethane as described by G. Pariani et al., Journal of Materials Chemistry, 2011, 21, 13223-13231. Pariani et al. made a diarylethene-based photochromic polyurethane co-polymers of such compounds, and similar procedures as that described by Pariani, et al. can be used. Such polyurethanes can be structure B of the A-B-A bridging groups and the A portions can be the ends of the polyurethane once they are transformed to amines according to procedures known to those skilled in the art. For example, the terminal amides of the polyurethane can be converted to terminal amines using lithium aluminum hydride, or catalytic hydrogenation using an Ru/Triphos catalytic system and a mild Lewis acid such as Yb($OTf_3$). Alternately, the B block of the A-B-A bridging group can be a polymer, such as polyurethane, without any photochrome content or of variable photochrome content. Variable photochrome content can be accomplished by controlling the ratio of the DAE to the diol and other polyols.

Scheme 3

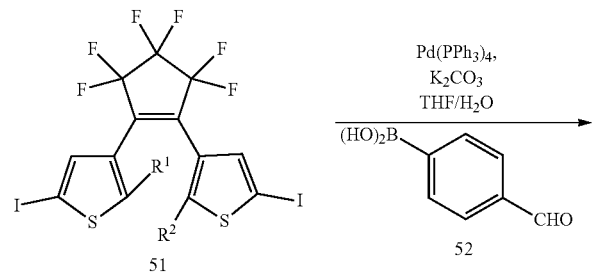

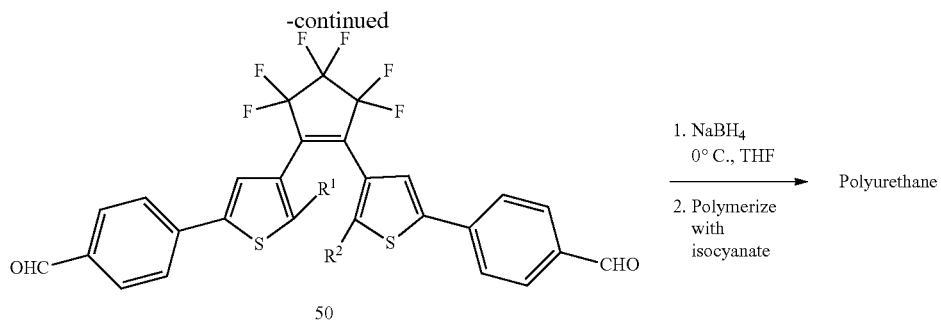

Alternately, and as shown in Scheme 4, aldehyde 60 ($R^1$=$CH_3$, $R^2$=$CH_3$) (4,4'-(perfluorocyclopent-1-ene-1,2-diyl)bis(5-methylthiophene-2-carbaldehyde)) can be reduced with sodium borohydride ($NaBH_4$) to provide the corresponding alcohol 61 ($R^1$=$CH_3$, $R^2$=$CH_3$) (((perfluorocyclopent-1-ene-1,2-diyl)bis(5-methylthiophene-4,2-diyl))dimethanol), and polymerized to a PEG by procedures known to those skilled in the art. The PEG product may then be transformed to an amino-PEG by procedures known to those skilled in the art such as nucleophilic substitution chemistry, and standard procedures for solvent removal and purification. For example, the terminal alcohols of the photochromic-PEG may be converted to O-tosylates using silver oxide ($Ag_2O$), potassium iodide (KI), and toluenesulfonyl chloride (TsCl). A nucleophilic substitution on the O-tosylates using sodium azide ($NaN_3$) at elevated temperatures, in either tetrahydrofuran (THF), chloroform, or aprotic solvents such as DMF, produces the terminal azide. Next, a Staudinger-type reduction of the terminal azide with triphenylphosphine ($PPh_3$) in methanol gives the PEG derivative with terminal amines. Thus, the amino-PEG is an A-B-A structure. Aldehyde 60 can be made by procedures according to Pariani et al., and references cited therein. The aldehyde 60 may be synthetically manipulated by a Horner-Wadsworth-Emmons (HWE) reaction to a corresponding alpha, beta-unsaturated ester 62 ($R^1$=$CH_3$, $R^2$=$CH_3$) (diethyl 3,3'-((perfluorocyclopent-1-ene-1,2-diyl)bis(5-methylthiophene-4,2-diyl))(2E,2'E)-diacrylate), or by a Wittig reaction to a corresponding alkene (not shown). Such esters and alkenes can be further modified and incorporated into an A-B-A bridging group.

Scheme 4

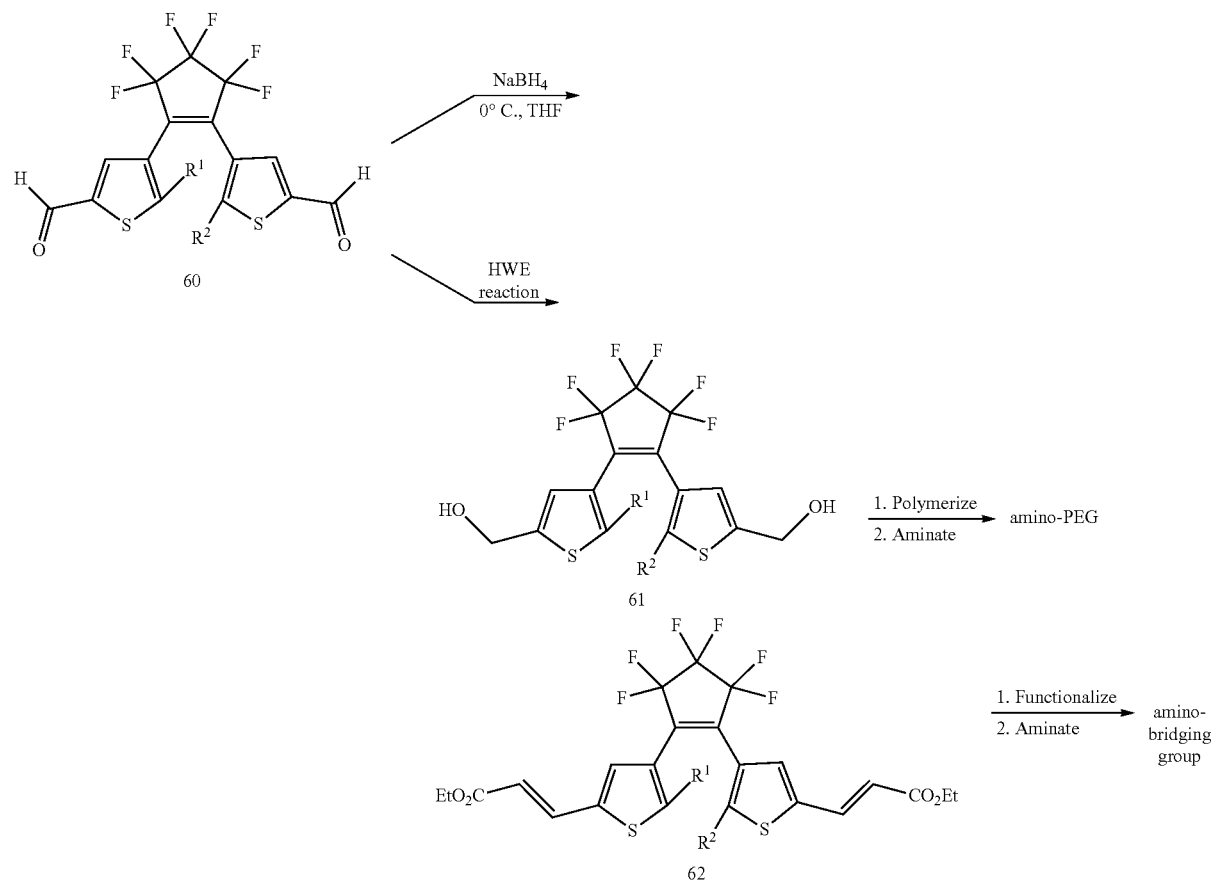

The HWE reaction may occur by the following prophetic process may be used. To a solution of TEPP (40 mmol, 3 equiv.) is added THF (70 mL) and stirred at room temperature under a nitrogen atmosphere. Lithium tert-butoxide (40 mmol of a 1.0 M solution in hexane) is added in one portion by syringe. After stirring for 15 minutes, the aldehyde 60 (13.3 mmol in 10 mL THF) is added dropwise over the course of 10 minutes. The solution is allowed to stir, monitoring for completion by standard procedures. When the reaction is deemed complete, the mixture is washed 4 times with water, and dried with MgSO$_4$. Standard procedures for solvent removal and purification are then performed to give the bis-alpha,beta-unsaturated ester 62. Further functionalization and amination would then create the A-B-A bridging group.

The A-B-A bridging groups described above are for illustrative purposes. One skilled in the art will know that various other A-B-A bridging groups can be used. This A-B-A moiety, having primary amines, can then participate in the PHT/PHA polymerization with a formaldehyde material.

Scheme 5

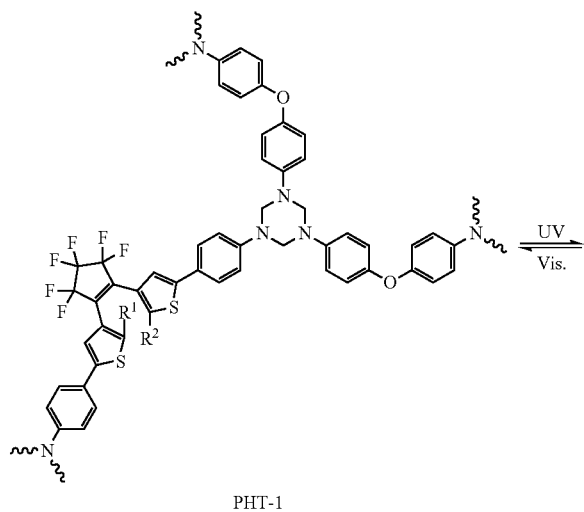

PHT-1

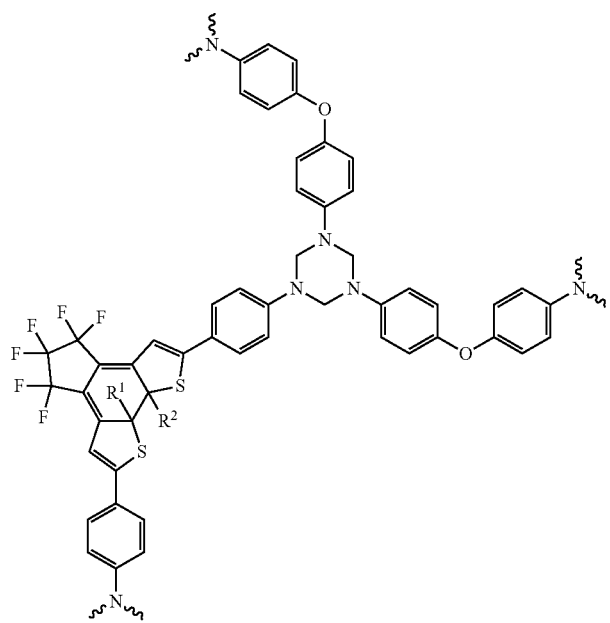

PHT-2

In an example of an embodiment, as shown in Scheme 5, a photochromic polymer (i.e., PHT-1) may undergo reversible transformation upon photoirradiation to PHT-2 ($R^1$=$CH_3$, $R^2$=$CH_3$) as poly(4,4'-(((5-(4-(8-(4-aminophenyl)-4,4,5,5,6,6-hexafluoro-9a,9b-dimethyl-5,6,9a,9b-tetrahydro-4H-indeno[5,4-b']dithiophen-2-yl)phenyl)-1,3,5-triazinane-1,3-diyl)bis(4,1-phenylene))bis(oxy))dianiline). Upon irradiation with ultraviolet (UV) light, the photochromic moiety converts from a ring-opened isomer to a closed-ring isomer along with a color change. The transformation is reversible by irradiation with visible (Vis.) light. It should be understood, that a photochromic PHA polymer (i.e., PHA-1) may also undergo reversible transformation upon photoirradiation.

The chemical bond rearrangement during phototransformation induces both structural and electronic changes of the photochromic polymer. Due to such changes, the polymeric assemblies described herein, such as photochromic-PHT, PHT, photochromic-PHA, PHA, and combinations thereof, may be used for such applications as molecular switches, color changing lenses, optical data storage, solar energy storage, and selective masking materials for nanolithography. Moreover, any desired polymer may form a composite material with a photochromic-PHA or photochromic-PHT material to provide selected properties.

The bridging groups in Scheme 5 are shown as divalent groups, but as noted above, a mixture of divalent and trivalent groups may be present, optionally with some monovalent groups. Additionally, different photochromic moieties, or combinations of photochromic moieties may be used in the polymer. Moreover, the ratio of photochromic moiety to bridging groups, or other species, may be altered.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing is directed to example embodiments of the present disclosure, other and further embodiments may be devised without departing from the basic scope thereof, and the scope thereof is determined by the claims that follow.

What is claimed is:

1. A polymer, comprising:
a plurality of hexahydrotriazine units, a plurality of hemiaminal units, or a combination thereof; and
a photochromic component covalently bonded to at least one hexahydrotriazine unit or hemiaminal unit.

2. The polymer of claim 1, wherein at least one nitrogen of each hexahydrotriazine unit or hemiaminal unit is bonded to a divalent bridging group or a trivalent bridging group having the structure

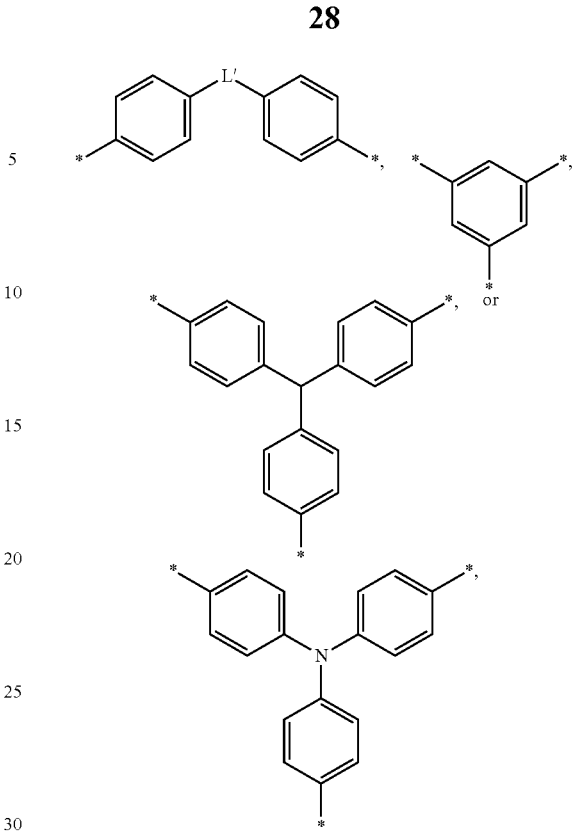

wherein L' is a divalent bridging group selected from the group consisting of —O—, —S—, —N(R')—, —N(H)—, —R"—, and combinations thereof, wherein R' and R" independently comprise at least 1 carbon.

3. The polymer of claim 1, wherein the photochromic component comprises a material consisting of a diarylethene.

4. The polymer of claim 1, wherein a nitrogen of at least one of the plurality of hexahydrotriazine units or at least one of the plurality of hemiaminal units is bonded to a monovalent group having the structure

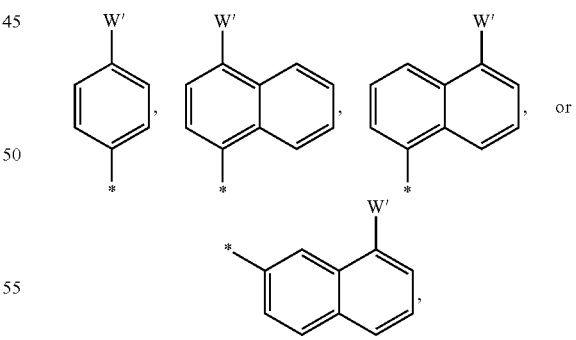

wherein W' is a monovalent radical selected from the group consisting of —N($R^1$)($R^2$), —$OR^3$, —$SR^4$, wherein $R^1$, $R^2$, $R^3$, and $R^4$ are independent monovalent radicals comprising at least one carbon.

5. A method of forming a photochromic polymer, comprising:
providing at least a formaldehyde material and a diamine or triamine to form a mixture, wherein at least one diamine or triamine is a photochrome amine; and performing a polymerization process on the mixture to form a photochromic polymer.

6. The method of claim 5, wherein at least a portion of the photochromic polymer is a reaction product of a formaldehyde material and a primary diamine.

7. The method of claim 5, wherein at least a portion of the photochromic polymer is a reaction product of a formaldehyde material and a primary triamine.

8. The method of claim 5, wherein the polymer comprises an aromatic bridging group.

9. The method of claim 5, wherein the mixture further comprises a monovalent group, divalent group, trivalent group, or a combination thereof.

10. The method of claim 9, wherein the monovalent group, divalent group, trivalent group, or the combination thereof, comprises at least one amine.

11. The method of claim 10, wherein the at least one amine comprises an aromatic amine.

12. The method of claim 5, wherein the photochrome amine comprises a material consisting of a diarylethene.

13. The method of claim 5, the mixture further comprising a solvent selected from the group consisting of of N-methyl-2-pyrrolidone (NMP), dimethylsulfoxide (DMSO), N,N-dimethylformamide (DMF), N,N-dimethylacetamide (DMA), propylene carbonate (PC), N-cyclohexyl-2-pyrrolidone (CHP), N,N'-dimethylpropyleneurea (DMPU), and propylene glycol methyl ether acetate (PGMEA).

14. The method of claim 5, wherein the photochromic polymer is formed by a process comprising:
   forming a mixture comprising one or more monomers comprising either two or three aromatic primary amine groups, a photochromic monomer, an optional monovalent monomer, a formaldehyde material, and optionally a solvent; and
   heating the mixture at a temperature of about 50° C.

15. The method of claim 14, further comprising heating the mixture at a temperature of about 50° C. to about 280° C. for about 1 minute to about 24 hours.

16. A method of forming a photochromic polymer, comprising:
   providing a diamine monomer, a triamine monomer, or a combination thereof;
   providing a photochromic monomer;
   exposing the diamine monomer, triamine monomer, or combination thereof, and the photochromic monomer to a formaldehyde material; and
   forming a photochromic polymer material comprising a polyhemiaminal, a polyhexahydrotriazine, or a combination thereof.

17. The method of claim 16, wherein the diamine monomer or triamine monomer comprises an aromatic material.

18. The method of claim 17, wherein the photochromic monomer comprises a material consisting of a diarylethene.

19. The method of claim 16, further comprising a solvent selected from the group consisting of of N-methyl-2-pyrrolidone (NMP), dimethylsulfoxide (DMSO), N,N-dimethylformamide (DMF), N,N-dimethylacetamide (DMA), propylene carbonate (PC), N-cyclohexyl-2-pyrrolidone (CHP), N,N'-dimethylpropyleneurea (DMPU), and propylene glycol methyl ether acetate (PGMEA).

20. The method of claim 16, wherein the photochromic polymer is formed by a process comprising:
   forming a mixture comprising one or more monomers comprising either two or three aromatic primary amine groups, a photochromic amine, a formaldehyde, and a solvent; and
   heating the mixture at a temperature of about 50° C. to about 280° C. for about 1 minute to about 24 hours.

* * * * *